United States Patent
Kim et al.

(10) Patent No.: US 11,694,827 B2
(45) Date of Patent: Jul. 4, 2023

(54) LIGHT-COLORED MAGNETIC PARTICLES HAVING IMPROVED DURABILITY AND CHEMICAL RESISTANCE

(71) Applicant: KOREA MINTING, SECURITY PRINTING & ID CARD OPERATING CORP., Daejeon (KR)

(72) Inventors: Hong Keon Kim, Daejeon (KR); Won Gyun Choe, Daejeon (KR); Su Dong Kim, Daejeon (KR); Hyun Soo Kim, Daejeon (KR); E Den Kim, Gwangju (KR); Hye Jun Choi, Daejeon (KR); Ju Hee Kang, Daejeon (KR)

(73) Assignee: Korea Minting, Security Printing & ID Card Operating Corp., Daejeon (KR)

( * ) Notice: Subject to any disclaimer, the term of this patent is extended or adjusted under 35 U.S.C. 154(b) by 0 days.

(21) Appl. No.: 16/958,308

(22) PCT Filed: Nov. 8, 2018

(86) PCT No.: PCT/KR2018/013521
§ 371 (c)(1),
(2) Date: Jun. 26, 2020

(87) PCT Pub. No.: WO2019/132232
PCT Pub. Date: Jul. 4, 2019

(65) Prior Publication Data
US 2020/0357544 A1    Nov. 12, 2020

(30) Foreign Application Priority Data
Dec. 29, 2017    (KR) .......................... 10-2017-0183726

(51) Int. Cl.
*H01F 1/047* (2006.01)
*B42D 25/29* (2014.01)
(Continued)

(52) U.S. Cl.
CPC ................ *H01F 1/09* (2013.01); *B22F 1/052* (2022.01); *B22F 1/147* (2022.01); *B22F 1/16* (2022.01);
(Continued)

(58) Field of Classification Search
CPC . H01F 1/047; H01F 1/015; H01F 3/02; H01F 1/01; B42D 25/29; B42D 25/369; C09D 11/037; C09D 5/23; C09D 11/03
(Continued)

(56) References Cited

U.S. PATENT DOCUMENTS

| 5,648,160 A | 7/1997 | Kishimoto et al. |
| 5,763,085 A * | 6/1998 | Atarashi .................. B22F 1/17 |
| | | 428/570 |

(Continued)

FOREIGN PATENT DOCUMENTS

| CA | 3006540 A1 | 8/2017 |
| CN | 104011809 A | 8/2014 |

(Continued)

*Primary Examiner* — Justin V Lewis
(74) *Attorney, Agent, or Firm* — The Webb Law Firm

(57) ABSTRACT

The present invention can provide light-colored magnetic particles having a zirconium oxide coating layer formed on a magnetic core, and having a silver coating layer formed on the zirconium oxide coating layer, and a part of the surface of the zirconium oxide coating layer is exposed to the outside, but chemical resistance is excellent, and thus the magnetic particles hardly cause a change of magnetic characteristics so as to be suitable for security elements.

5 Claims, 2 Drawing Sheets

(51) Int. Cl.
  *B42D 25/369* (2014.01)
  *C09D 11/037* (2014.01)
  *C22C 38/16* (2006.01)
  *C22C 38/06* (2006.01)
  *H01F 1/09* (2006.01)
  *B22F 1/16* (2022.01)
  *B22F 1/145* (2022.01)
  *B22F 1/17* (2022.01)
  *B22F 1/052* (2022.01)

(52) U.S. Cl.
  CPC ................ *B22F 1/17* (2022.01); *B42D 25/29* (2014.10); *B42D 25/369* (2014.10); *C09D 11/037* (2013.01); *H01F 1/047* (2013.01)

(58) Field of Classification Search
  USPC .......................... 283/72, 74, 91, 94, 98, 901
  See application file for complete search history.

(56) References Cited

U.S. PATENT DOCUMENTS 9,721,705 B2    8/2017  Choe et al.
2002/0119255 A1*  8/2002  Divigalpitiya .......... B05B 5/057
                                                427/482
2007/0184268 A1   8/2007  Kishimoto et al.
2012/0091701 A1*  4/2012  Krueger ................... C09D 7/62
                                                283/72
2015/0235745 A1*  8/2015  Choe ......................... H01F 1/26
                                                106/31.92
2018/0236724 A1*  8/2018  Compton ................ H01F 7/021
2019/0040271 A1   2/2019  Krueger et al.
2020/0391285 A1  12/2020  Choe et al.

FOREIGN PATENT DOCUMENTS

| | | |
|---|---|---|
| CN | 111357063 A | 6/2020 |
| JP | H1253758 A | 10/1989 |
| JP | H8138921 A | 5/1996 |
| KR | 1020060028393 A | 3/2006 |
| KR | 100581456 B1 | 5/2006 |
| KR | 1020130043410 A | 4/2013 |
| KR | 101718505 B1 | 3/2017 |
| KR | 1020170078009 A | 7/2017 |
| KR | 1020170078023 A | 7/2017 |

* cited by examiner

【FIG. 1】
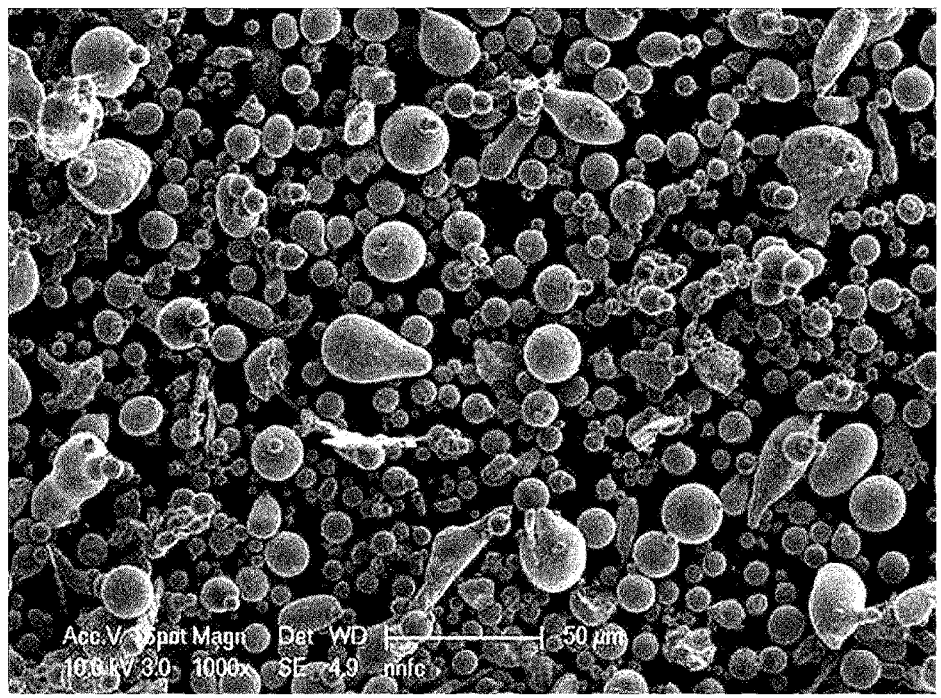
【FIG. 2】
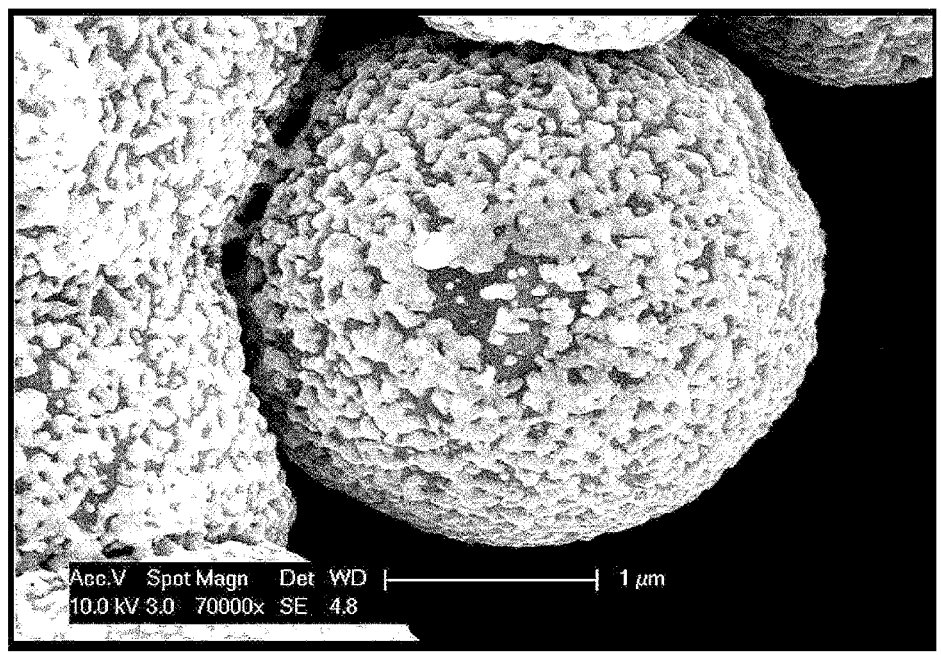

【FIG. 3】
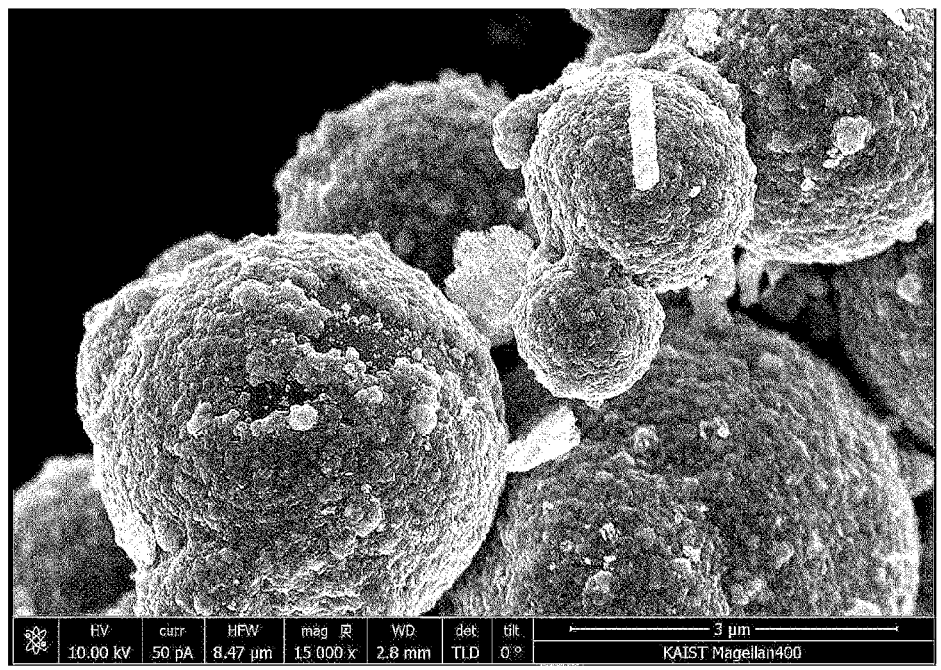
【FIG. 4】
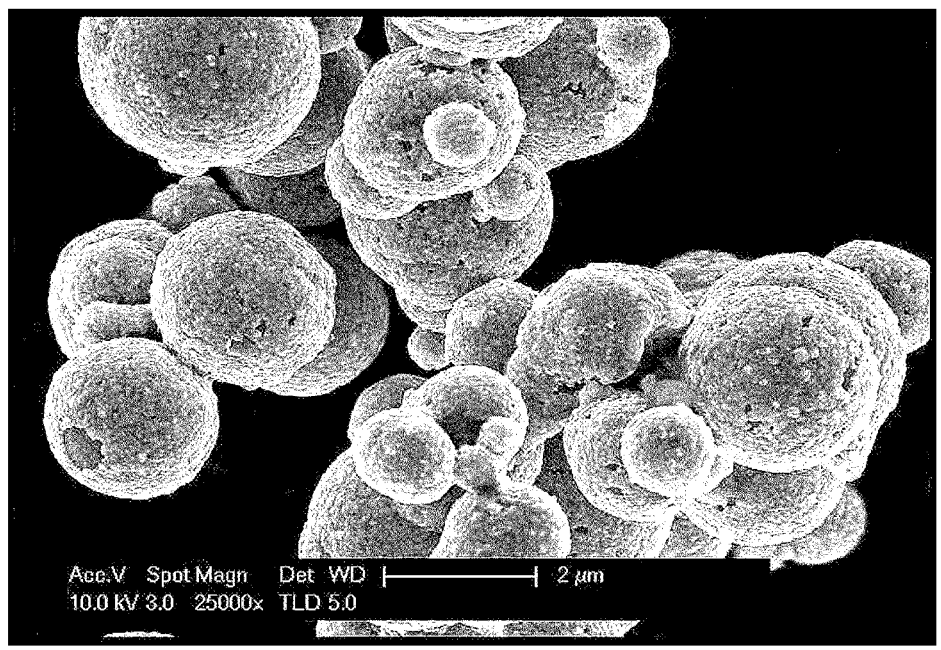

LIGHT-COLORED MAGNETIC PARTICLES HAVING IMPROVED DURABILITY AND CHEMICAL RESISTANCE

CROSS-REFERENCE TO RELATED APPLICATIONS

This application is the United States national phase of International Application No. PCT/KR2018/013521 filed Nov. 8, 2018, and claims priority to Korean Patent Application No. 10-2017-0183726 filed Dec. 29, 2017, the disclosures of which are hereby incorporated by reference in their entirety.

TECHNICAL FIELD

The present invention relates to light-colored magnetic particles which may be applied to and used in various fields including inks, paints, pigments, cosmetic materials, and the like, and a method of producing magnetic particles.

BACKGROUND ART

A magnetic material is used in various fields, and in an anti-counterfeiting field using the magnetic materials, a security ink including the magnetic materials is applied for counterfeiting and falsification of securities and the like.

Most of security inks including the magnetic material are difficult to visually identify and have a feature of confirming authenticity by change in magnetic strength and the like of the magnetic material included in the security ink by a specific machine. However, the magnetic material has a dark color, when the magnetic material is used as it is in an ink, it is difficult for the ink to show a bright and light color. In order to conceal the dark color of the magnetic material, there are a number of methods of forming various coating layers on the magnetic material. For example, Korean Patent Laid-Open Publication No. 2006-0028393 discloses magnetic particles having a light color by forming a titanium oxide layer and a metallic silver layer in this order on magnetic particle powder.

As such, a method of forming a light metal layer on a magnetic material is mainly used for concealing the dark color of the magnetic material, but most of the metal layers have bad durability and various chemical reactions may occur depending on the kind of metal, so that chemical resistance for preventing occurrence of a chemical reaction is not good. Even when a titanium oxide layer and a metallic silver layer are coated as described in Korean Patent Laid-Open Publication No. 2006-0028393, titanium oxide may act as a photocatalyst, the magnetic material is very vulnerable particularly to ultraviolet rays (UV) and easily changes color.

In order to solve the problems, the inventors of the present invention recognize that in particles using a magnetic material as a core and including a multilayer coating layer formed of a metal oxide and a metal, selection of a coating layer and adjustment of conditions are very important, thereby completing the present invention.

DISCLOSURE

Technical Problem

An object of the present invention is to solve problems which may occur in magnetic particles in which a metal oxide layer and a metal layer are formed on a magnetic material by forming a certain metal oxide layer and a metal layer and to provide light-colored magnetic particles having chemical properties and mechanical physical properties.

Technical Solution

In one general aspect, a light-colored magnetic particle includes: a magnetic core which is a substrate being a center of the particle, a zirconium oxide coating layer formed on the magnetic core, and a silver coating layer formed on the zirconium oxide coating layer.

Advantageous Effects

The light-colored magnetic particle of the present invention may solve a vulnerability problem to chemical and physical changes which may occur in magnetic particles including a magnetic material, a metal oxide coating layer, and a metal layer, by forming a zirconium oxide coating layer as the metal oxide coating layer on a magnetic core and forming a silver coating layer as the metal coating layer.

DESCRIPTION OF DRAWINGS

FIGS. 1 and 2 show a process of forming a silver coating layer on a metal oxide coating layer, in which the silver coating layer grows in some islands.

FIGS. 3 and 4 show that the metal oxide coating layer is exposed to the outside and some magnetic particles may agglomerate together.

BEST MODE

Hereinafter, the present invention will be described in detail. Terms used in the present specification should be interpreted as having the meaning commonly understood by a person skilled in the art, unless otherwise defined. Drawings and examples of the present specification are for a person skilled in the art to easily understand and carry out the present invention, and descriptions which may obscure the gist of the present invention may be omitted in the drawings and the examples, and the present invention is not limited by the drawings and the examples.

The present invention relates to a magnetic particle including a magnetic material which may be used in various fields such as inks, which are applicable to various prints, and also paints, pigments, and cosmetics.

The magnetic particle of the present invention is obtained by forming a zirconium oxide ($ZrO_2$) coating layer on a magnetic core and forming a silver (Ag) coating layer on the zirconium oxide coating layer, and may solve the problems which may conventionally occur in magnetic particles in which a metal oxide coating layer and a metal coating layer are formed.

The magnetic particle including a magnetic material as a core which is a center particle may use various magnetic properties such as coercivity and magnetization density, and thus, may be used for various applications including inks. However, since the magnetic material itself has a dark color such as black, it is necessary to form various coating layers on the magnetic material for imparting a bright color by various methods. For example, a dielectric layer having a large difference in reflectance is coated in multiple layers to increase reflectance, or a metal layer of a precious metal such as gold, silver, and platinum having a bright color is formed to obtain magnetic particles having a high brightness. Furthermore, considering durability or chemical resistance of the magnetic particles, a multilayer coating layer in which a metal oxide coating layer and a metal layer are mixed is formed on the magnetic material.

In the magnetic particle of the present invention, a silver content of a silver coating formed on the zirconium oxide coating layer is 10 to 20% by weight relative to the weight of a magnetic core. According to an exemplary embodiment of the present invention, the silver coating layer may be formed in a uniform thickness, and when the silver content of the silver coating layer is less than 10% by weight, the metal oxide coating layer may not be sufficiently coated, so that chemical resistance may be significantly decreased. When the silver content of the silver coating layer is more than 20% by weight, durability may be decreased and a non-uniform silver coating layer may be formed. In addition, particles are not sufficiently dispersed in a silver coating layer formation process during magnetic particle production to significantly increase agglomeration, and the agglomerated particles are separated from each other to cause a severe damage to the silver coating layer and the like, so that it may be difficult to form a uniform silver coating layer.

The silver coating layer in the magnetic particle of the present invention has a thickness of 50 to 120 nm, 50 to 115 nm, 50 to 110 nm, 55 to 120 nm, 55 to 115 nm, 55 to 110 nm, 60 to 120 nm, 60 to 115 nm, 60 to 110 nm, 65 to 120 nm, 65 to 115 nm, 65 to 110 nm, 70 to 120 nm, 70 to 115 nm, 70 to 110 nm, 75 to 120 nm, 75 to 115 nm, 75 to 110 nm, 80 to 120 nm, 80 to 115 nm, 80 to 110 nm, 85 to 120 nm, 85 to 115 nm, 85 to 110 nm, 90 to 120 nm, 90 to 115 nm, 90 to 110 nm, 95 to 120 nm, 95 to 115 nm, 95 to 110 nm, 100 to 120 nm, 100 to 115 nm, or 100 to 110 nm. According to an exemplary embodiment of the present invention, when the silver content of the silver coating layer is 10 to 20% by weight relative to the weight of the magnetic core, the silver coating layer may be formed within 40 to 110 nm, 50 to 120 nm, or 70 to 110 nm.

The magnetic particle of the present invention has a reflectance of 45 to 75%, preferably 50 to 70% at a wavelength of 900 nm. According to an exemplary embodiment of the present invention, a reflectance may vary with a use amount of silver used when the silver coating layer is formed and a silver content of the silver coating layer, but as the particle has a visually uniform and bright color, it is preferred that the reflectance depending on an economical silver use amount and the silver content of the silver coating layer satisfies 45 to 75% at a wavelength of 900 nm.

In the magnetic particle of the present invention, the surface of the zirconium oxide coating layer may be partially exposed to the outside. The surface of the zirconium oxide coating layer may be partially exposed by not sufficiently coating the entire zirconium oxide coating layer with the silver coating layer, by separation after agglomeration between particles occurring in a silver coating layer formation process during a magnetic particle production process, or optionally by adjusting a silver use amount (content) when the silver coating layer is formed. In the present invention, the partial surface exposure of the zirconium oxide coating layer may mean that the silver coating layer is not normally formed on the surface of the zirconium oxide coating layer, so that the surface of the zirconium oxide coating layer is partially exposed to the outside. In the magnetic particle of the present invention, the silver coating layer which has been formed on the zirconium oxide coating layer in an agglomeration and separation process of particles occurring in a production process may be peeled off as long as silver is not excessively used in the magnetic particle production process.

According to an exemplary embodiment of the present invention, when an outermost coating layer is formed into a silver coating layer as a metal layer, it is difficult to completely prevent the surface of the zirconium oxide coating layer formed under the silver coating layer from being partially exposed to the outside. In order to completely coat the zirconium oxide coating layer with the silver coating layer so that the zirconium oxide coating layer is not exposed to the outside, it is necessary to make the silver use amount or the silver coating layer content exceed 20 to 50% by weight relative to the magnetic core, and when the silver use amount or the silver coating layer content is excessively increased, the silver coating layer thickens, it is difficult to form a uniform silver coating layer, and the yield of the magnetic particles may be decreased due to a significant increase of agglomeration between particles.

According to the present invention, even in the case of forming the zirconium oxide coating layer on the magnetic core and forming the silver coating layer on the zirconium oxide coating layer so that the surface of the zirconium oxide coating layer is partially exposed to the outside, magnetic particles having improved chemical resistance and durability may be provided. In general, when a metal coating layer is formed on the outermost particle, chemical resistance and durability may not be sufficiently improved due to the nature of the metal layer, and discoloration of the particles may be shown by the chemical reaction of the metal oxide coating layer or dielectric layer on which the metal coating layer is formed. Further, since the metal oxide coating layer is thin, chemical denaturation due to the exposed portion may easily occur. In addition, the magnetic properties of the magnetic core may rapidly change in the particles using a magnetic material as the core.

In the present invention, the zirconium oxide coating layer has a thickness of 5 to 15 nm, 6 to 15 nm, 7 to 15 nm, and preferably 8 to 15 nm.

According to an exemplary embodiment of the present invention, in the magnetic particles having a zirconium oxide ($ZrO_2$) coating layer formed on the magnetic core and a silver coating layer formed on the zirconium oxide coating layer, though the surface of the zirconium oxide coating layer is partially exposed to the outside, chemical resistance is excellent and the magnetic properties may remain constant. However, the magnetic particles having a titanium oxide ($TiO_2$) coating layer or a silicon dioxide ($SiO_2$) coating layer formed as the metal oxide coating layer on the magnetic core and a silver coating layer formed on the metal oxide coating layer has poor chemical resistance so that discoloration easily occurs and the magnetic properties of the magnetic core may greatly change.

According to another exemplary embodiment of the present invention, in the magnetic particle having a metal oxide coating layer formed on a magnetic core and a silver coating layer formed on the metal oxide coating layer, when a silver content of the silver coating layer is 10 to 20% by weight relative to the magnetic core, the thickness of the silver coating layer is formed to be 40 to 110 nm, 50 to 120 nm, or 70 to 110 nm and the surface of the silver coating layer is partially exposed to the outside, but when the metal oxide coating layer is a zirconium oxide coating layer, discoloration hardly occurs even after a long time, chemical resistance is excellent, and the magnetic properties of the magnetic may remain constant without a great change.

In the present invention, the magnetic core is a metal or a metal alloy having magnetism, and preferably a hard magnetic material, but is not limited thereto. The magnetic core may be a magnetic core including one or more selected from the group consisting of Fe, Cu, Al, Ni, Co, Nb, Nd, Si, B, Cr, and Sm. The more preferred magnetic core may be AlNiCo, FeCrCo, or Cunife. It is preferred that the method of producing magnetic cores of the present invention uses a water-based atomization method.

Hereinafter, the method of producing magnetic cores of the present invention will be described in detail. A raw material of the magnetic core is melted and solidified under an inert atmosphere to produce an ingot, the ingot is melted under an inert atmosphere and fine particles are produced by atomization using a cooling medium including water and an antioxidant, and then the produced fine particles are heat-treated and the heat-treated fine particles are air-classified to produce magnetic cores. As the antioxidant, a reducing organic solvent, a reducing organic compound, or a mixture thereof may be used, as the antioxidant, it is preferred to use a compound including urea, and as the reducing organic solvent, it is preferred to use alkanolamine. In the case of the cooling medium, it is preferred to include 10 to 100 parts by weight of urea, based on 100 parts by weight of water, and only when the cooling medium is adjusted under a condition of an atomization pressure of 500 to 1000 bar, the magnetic cores having a constant particle size distribution and a size appropriate for ink production may be produced. A heat treatment temperature in a heat treatment step of fine particles is preferably 700 to 800° C., and a particle size is selected after heat treatment and a production process may be performed. The material of the magnetic core may be appropriately selected depending on the magnetic core to be produced, and for example, one or more materials selected from the group consisting of Fe, Cu, Al, Ni, Co, Nb, Nd, Si, B, Cr, and Sm may be selected to produce the magnetic core. More specifically, Al, Ni, and Co are used as the raw material in the production of AlNiCo, Fe, Cr, and Co are used in the production of FeCrCo, or Cu, Ni, and Fe may be used in the production of CuNiFe.

The magnetic core of the present invention is preferably a spherical shape and may be a plate shape for improving a reflectance, but may have an excellent reflectance even in the case of being a spherical shape.

In the present invention, the size of the magnetic core may be 0.4 to 20 µm, 0.5 to 15 µm, or 0.5 to 10 µm, but is not limited thereto. Preferably, the magnetic core may have $D_{90}$ of 6 to 15 µm, 7 to 15 µm, or 8 to 15 µm, based on the particle size distribution of the magnetic core. The magnetic core of 15 µm or less may be preferred, considering the thickness of the multilayer coating layer formed on the magnetic core and the size for being easily applied to printing when used in ink production.

In the present invention, the final size of the magnetic particle having a multilayer coating layer formed on the magnetic substrate is 1 to 20 µm, preferably 1 to 15 µm, and more preferably 1 to 10 µm, but is not particularly limited thereto. When the magnetic particles of the present invention are used in the production of a security ink, the size of the particles is preferably 15 µm or less so that the particles are easily applied to printing, but is not limited thereto.

The magnetic substrate may be used by producing a hard or soft magnetic body, and is preferably a hard magnetic body when the magnetic particles of the present invention are used as a security element such as an image, a number, and a letter.

A metal oxide coating layer or a dielectric layer may be further formed on a silver coating layer for improving durability of the magnetic particle of the present invention. When a coating layer is further formed on the silver coating layer, durability and chemical resistance may be further improved. When a multilayer coating layer is formed in the formation of a further coating layer on the silver coating layer, it is preferred to consider the color, the brightness, the saturation, and the brightness change of the magnetic particles.

The magnetic particle of the present invention may be used by being applied to various fields including inks, paints, pigments, cosmetic materials, and the like, and may be more appropriate for production of a security ink in the field of forgery and alteration prevention.

The present invention may provide an ink, a paint, a pigment, or a cosmetic including the magnetic particles of the present invention.

The present invention may provide securities to which an ink including the magnetic particles of the present invention is applied.

The security ink including the magnetic particles of the present invention may be produced by mixing the magnetic particles with one or more components selected from the group consisting of colorants, varnishes, solvents, dispersants, and extenders (fillers).

A colorant may include a pigment representing the color used in an ink production, and may be used at 5 to 15% by weight, preferably 8 to 12% by weight, and more preferably 7 to 12% by weight relative to the entire ink composition, but is not limited thereto.

A varnish may increase adhesion of an ink and protect the magnetic particles from an external stimulus. The varnish is one or more selected from the group consisting of an alkyd varnish, an alkyd resin varnish, a urea resin varnish, a phenol resin varnish, a melamine resin varnish, a polyurethane resin varnish, and a urea resin varnish and a mixture of two or more selected therefrom may be used, but the kind of varnish is not particularly limited. A mixing amount of the varnish may be 10 to 30% by weight, preferably 15 to 25% by weight relative to the entire ink composition.

As a solvent, a mixture of a glycolether-based solvent such as diethylene glycol monobutyl ether, diethylene glycol monoethyl ether, and diethylene glycol monomethyl ether and a hydrocarbon-based solvent may be used, but the present invention is not limited thereto. The solvent may be used at 5 to 10% by weight, preferably 3 to 7% by weight, and more preferably 2 to 5% by weight relative to the entire ink composition, but is not limited thereto.

In the present invention, as an extender, silicon dioxide, talc, barium sulfate, calcium carbonate, or the like may be used, but the present invention is not limited thereto. The extender is used at 20 to 30% by weight, preferably 20 to 25% by weight relative to the entire ink composition, but is not limited thereto.

Additionally, a wax, a fatty acid, a moisture adsorbent, or the like may be further used in an ink production.

The magnetic particles of the present invention have excellent chemical resistance and durability and are hardly damaged in an ink production process, so that optical properties such as lightness, brightness, and reflectance may remain constant in a printing process and even after printing. In particular, there is no long-term color change and no magnetic property change, effects of concealment and security may remain constant.

Hereinafter, Examples of the present invention will be described in detail, but the present invention is not limited to the following Examples.

In the present invention, the optical properties, the magnetic properties, and the chemical resistant properties of magnetic particles were measured in the following methods.

Example 1

Production of Magnetic Particles in which Zirconium ($ZrO_2$) and Silver (Ag) Coating Layers were Formed AlNiCo, FeCrCo, and Cunife magnetic cores were prepared as a magnetic substrate, and a zirconium oxide coating layer and a silver coating layer were formed on each magnetic core.

[Production of Hard Magnetic Body AlNiCo]

Raw material powders (aluminum powder, nickel powder, cobalt powder, titanium powder, copper powder, and iron powder, purity of the raw material 99.9%) were mixed according to the composition of the following [Table 1], dissolved under an inert atmosphere, and then solidified to produce an ingot.

TABLE 1

| Element | Al | Ni | Co | Ti | Cu | Fe |
|---|---|---|---|---|---|---|
| Content (% by weight) | 6 | 15 | 22 | 4 | 3 | Remainder |

1 kg of the produced ingot was placed in a crucible which was heated by a high frequency generator and placed in an inert atmosphere, and the temperature was maintained at 1600 to form an AlNiCo-based molten metal. For fine particle formation, the molten metal was injected into a vacuum atomization confinement, and a cooling medium which was an aqueous urea solution in which 25% by weight of urea was dissolved was atomized at 600 bar through a circular atomization nozzle. The produced fine particles were heat-treated at 750 for 1 hour under an argon gas atmosphere.

The particles obtained after the heat treatment were subjected to airflow classification in a cyclonic manner under the conditions of a rotation speed of 7500 rpm and an air injection amount of 2.8 $m^3$/min to obtain core particles having $D_{50}$ of 7.8 μm and $D_{90}$ of 14.1 μm. Thereafter, the core particles obtained by airflow classification were washed twice with ethanol and then dried at 60.

After about 1 g was randomly sampled from the obtained core particles, the center area of the particle section was subjected to elemental analysis (10 kV, 100 sec) by Energy Dispersive X-Ray Spectroscopy (EDS, FEI company, Magellan 400), each of 50 particles was subjected to elemental analysis, and an average composition for each element and a standard deviation of the composition were calculated, thereby confirming whether the magnetic core to be desired was produced.

On the produced magnetic core, a metal oxide coating layer and a metal coating layer were further formed, and magnetic properties such as coercivity, saturation magnetization (Ms), and residual magnetization (Mr) were measured using a vibrating sample magnetometer (VSM, Lakeshore, 7400 series).

[Production of Hard Magnetic Body FeCrCo]

FeCrCo was produced in the same manner as in the production of AlNiCo, except that the composition of the raw material powder was prepared as shown in the following [Table 2].

TABLE 2

| Element | Co | Cr | Fe |
|---|---|---|---|
| Content (% by weight) | 25 | 8 | Remainder |

[Production of Hard Magnetic Body CuNiFe]

CuNiFe was produced in the same manner as in the production of AlNiCo, except that the composition of the raw material powder was prepared as shown in the following [Table 3].

TABLE 3

| Element | Cu | Ni | Si | Fe |
|---|---|---|---|---|
| Content (% by weight) | 42 | 21 | 0.5 | Remainder |

A zirconium oxide coating layer was formed on the magnetic core according to the following method.

[Formation of $ZrO_2$ Layer on Magnetic Core]

1 g of the magnetic core and 1 ml of distilled water were added to ethanol, and irradiated with ultrasound for dispersion. 1 ml of zirconium tert-butoxide (Aldrich) and 170 ml of ethanol were mixed and slowly added. The solution was stirred at a temperature of 85° C. for 3 hours at a rotation speed of 300 rpm. Particles coated with a zirconium oxide coating layer (11.2 nm) were separated with a magnet, washed twice with ethanol, and dried.

[Formation of Silver (Ag) Coating Layer on $ZrO_2$ Coating Layer]

21 g of silver nitrate ($AgNO_3$) and 4 g of sodium hydroxide (NaOH) were added to 1200 ml of distilled water, 34 ml of ammonium hydroxide ($NH_4OH$) was added, and the solution was stirred so that brown precipitate changed to a transparent silver amine complex solution. After 60 g of the particles in which a zirconium oxide coating layer was formed was added to a silver amine complex solution which was maintained at 3, the solution was stirred for 30 minutes at a speed of 300 rpm. A solution (3) in which 20 g of glucose and 1.5 g of potassium tartrate were dissolved in 400 ml of distilled water was added to a silver amine complex solution (3) in which the core particles coated with a titanium dioxide shell were dispersed, and then the solution was stirred at a speed of 300 rpm for 1 hour, thereby forming a silver coating layer having an average thickness of 100 nm and a silver content of 15.6% by weight relative to the weight of the magnetic core, on the core particles on which the zirconium oxide coating layer was formed. Thereafter, the produced magnetic particles were separated by a magnet, washed twice with ethanol, and dried at 60.

Magnetic particles in which the zirconium oxide coating layer and the silver coating layer were formed on the magnetic core were produced in the same manner as in the Example, except that the silver content of the silver coating layer was different.

The silver content of the silver coating layer was calculated as a reduced silver content in silver nitrate used in synthesis.

Whether the zirconium oxide coating layer was exposed in the magnetic particles was confirmed by a photograph taken by SEM (FEI company, Magellan 400) (FIGS. 3 and 4).

Comparative Example 1

Production of Magnetic Particles in which Titanium Oxide ($TiO_2$), Silicon Dioxide ($SiO_2$), and Silver (Ag) Coating Layers were Formed AlNiCo, CuNiFe, and FeCrCo which were produced in the same manner as in the Example were used as the magnetic core, titanium oxide ($TiO_2$) and silicon dioxide ($SiO_2$) coating layers were formed on the magnetic core, and then a silver coating layer was formed. The titanium oxide coating layer and the silicon dioxide coating layer were formed in the following manner, and the silver coating layer was formed in the same manner as in the Example.

[Formation of $TiO_2$ Layer on Magnetic Core]

For the magnetic core, 1 g of magnetic core particles, 1 ml of tetrabutoxy titanium (TBOT, Aldrich), and 1 ml of distilled water were added to 170 ml of ethanol, and then stirred at a temperature of 85 for 2 hours at a rotation speed of 300 rpm to form a titanium oxide coating layer (thickness of 12.5 nm) on the surface of the core particles. The core particles on which a titanium oxide coating layer was formed were separated with a magnet and collected, and then washed twice with ethanol and dried.

[Formation of $SiO_2$ Layer on Magnetic Core]

For the magnetic core, 1 g of magnetic core particles, 1 ml of tetraethyl orthosilicate (TEOS, Aldrich), and 1 ml of distilled water were added to 170 ml of ethanol, and then stirred at a temperature of 85 for 2 hours at a rotation speed of 300 rpm to form a titanium oxide coating layer (thickness of 12.5 nm) on the surface of the core particles. The core particles on which a titanium oxide coating layer was formed were separated with a magnet and collected, and then washed twice with ethanol and dried.

Magnetic particles in which a titanium oxide coating layer and a silver coating layer were formed on the magnetic core and magnetic particles in which a silicon dioxide coating layer and a silver coating layer were formed on the magnetic core were produced in the same manner as in the above Comparative Example, except that the silver content of the silver coating layer was different.

The silver content of the silver coating layer was calculated as a reduced silver content in silver nitrate used in synthesis.

Whether the zirconium oxide coating layer was exposed in the magnetic particles was confirmed by a photograph taken by SEM (FEI company, Magellan 400).

Experimental Examples

10% by weight of the magnetic particles produced according to the above Example and the Comparative Example were mixed with a security ink for securities, colored on paper using an applicator, and dried for 48 hours or more, and reflectance, light fastness, alkali resistance, acid resistance, and magnetic properties were measured. The measurement results are shown in [Table 5] to [Table 13]. The composition of the ink mixed with the magnetic particles is as shown in the following [Table 4].

TABLE 4

| Ink composition | % by weight |
|---|---|
| First varnish (KANGNAM JEVISCO CO., LTD., KR-KU) | 18 |
| Second varnish (KANGNAM JEVISCO CO., LTD., KR-KA) | 14 |
| Filler | 5 |
| Extender (DongHo Calcium Corporation, TL-2000) | 34 |
| AlNiCo-based magnetic particle | 10 |
| Mixed wax (Micro Powders, Polyfluo 540XF) | 8 |
| Aliphatic hydrocarbon (SK chemicals, YK-D130) | 2 |
| Solvent (Diethylene glycol monobutyl ether) | 2 |
| Surfactant (HANNONG CHEMICALS INC., Koremul-263Na) | 5 |
| Desiccant | 2 |
| Total | 100 |

—Measurement of Reflectance

A reflectance was measured using a reflectometer (Varian, Cary 5000).

—Measurement of Light Fastness

Light fastness was measured according to ISO 2835, and the experiment was performed for 240 hours using a light fastness experimental machine (Atlas, Ci4000 Xenon Weather-Ometer).

—Measurement of Alkali Resistance

Alkali resistance was measured at 23° C. for 100 hours using a 1 M KOH solution.

—Measurement of Acid Resistance and Magnetic Properties

Acid resistance was measured by precipitating 10 g of magnetic particles in a 0.1 M HCl solution and then measuring a magnetic property change of the magnetic particles using a vibrating sample magnetometer (VSM, Lakeshore, 7400 series).

TABLE 5

Measurement of light fastness-AlNiCo magnetic core

| Magnetic particle | Silver content (% by weight) | Reflectance (900 nm) | Exposure of $ZrO_2$ coating layer | $ZrO_2$ (inorganic shell) coating layer thickness (nm) | Ag coating layer thickness (nm) | Color change (hour) 72 | 144 | 240 |
|---|---|---|---|---|---|---|---|---|
| AlNiCo/$ZrO_2$/Ag | 8.7 | 54% | Partially exposed | 8~15 | 40~50 | ⊚ | O | X |
| | 10.2 | 60% | Partially exposed | 8~15 | 50~60 | ⊚ | ⊚ | O |
| | 15.6 | 62% | Partially exposed | 8~15 | 80~90 | ⊚ | ⊚ | O |
| | 19.8 | 66% | Partially exposed | 8~15 | 100~110 | ⊚ | ⊚ | O |
| AlNiCo/$TiO_2$/Ag | 8.9 | 52% | Partially exposed | 8~15 | 40~50 | O | X | X |
| | 10.4 | 58% | Partially exposed | 8~15 | 50~60 | O | O | X |

TABLE 5-continued

Measurement of light fastness-AlNiCo magnetic core

| Magnetic particle | Silver content (% by weight) | Reflectance (900 nm) | Exposure of ZrO$_2$ coating layer | ZrO$_2$ (inorganic shell) coating layer thickness (nm) | Ag coating layer thickness (nm) | Color change (hour) 72 | 144 | 240 |
|---|---|---|---|---|---|---|---|---|
| | 14.9 | 61% | Partially exposed | 8~15 | 80~90 | O | O | X |
| | 19.3 | 65% | Partially exposed | 8~15 | 100~110 | O | O | X |
| AlNiCo/ SiO$_2$/Ag | 8.9 | 50% | Partially exposed | 8~15 | 40~50 | O | O | X |
| | 10.1 | 57% | Partially exposed | 8~15 | 50~60 | ⊚ | O | X |
| | 15.8 | 60% | Partially exposed | 8~15 | 80~90 | ⊚ | O | O |
| | 19.7 | 63% | Partially exposed | 8~15 | 100~110 | ⊚ | O | O |

* Color change was visually observed.
⊚: No color change,
O: weak color change,
X: color changed to yellow

TABLE 6

Measurement of light fastness-FeCrCo magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Color change (hour) 72 | 144 | 240 |
|---|---|---|---|---|---|---|---|---|
| FeCrCo/ ZrO$_2$/Ag | 8.8 | 53% | Partially exposed | 8~15 | 40~50 | ⊚ | O | X |
| | 10.4 | 59% | Partially exposed | 8~15 | 70~80 | ⊚ | ⊚ | O |
| | 14.9 | 63% | Partially exposed | 8~15 | 80~90 | ⊚ | ⊚ | O |
| | 19.7 | 66% | Partially exposed | 8~15 | 100~110 | ⊚ | ⊚ | O |
| FeCrCo/ TiO$_2$/Ag | 8.7 | 54% | Partially exposed | 8~15 | 40~50 | O | X | X |
| | 10.2 | 60% | Partially exposed | 8~15 | 70~80 | O | O | X |
| | 14.8 | 64% | Partially exposed | 8~15 | 80~90 | O | O | X |
| | 19.6 | 66% | Partially exposed | 8~15 | 100~110 | O | O | X |
| FeCrCo/ SiO$_2$/Ag | 8.8 | 52% | Partially exposed | 8~15 | 40~50 | O | O | X |
| | 10.3 | 59% | Partially exposed | 8~15 | 70~80 | ⊚ | O | X |
| | 14.6 | 63% | Partially exposed | 8~15 | 80~90 | ⊚ | O | O |
| | 19.4 | 66% | Partially exposed | 8~15 | 100~110 | ⊚ | O | O |

* Color change was visually observed.
⊚: No color change,
O: weak color change,
X: color changed to yellow

TABLE 7

Measurement of light fastness - CuNiFe magnetic core

| Magnetic particle | Silver content (% by weight) | Reflectance (900 nm) | Exposure of ZrO₂ coating layer | ZrO₂ coating layer thickness (nm) | Ag coating layer thickness (nm) | Color change (hour) | | |
|---|---|---|---|---|---|---|---|---|
| | | | | | | 72 | 144 | 240 |
| CuNiFe/ ZrO₂/Ag | 9.0 | 52% | Partially exposed | 8~15 | 40~50 | ◉ | ○ | X |
| | 10.1 | 60% | Partially exposed | 8~15 | 70~80 | ◉ | ◉ | ○ |
| | 16.1 | 63% | Partially exposed | 8~15 | 80~90 | ◉ | ◉ | ○ |
| | 19.9 | 65% | Partially exposed | 8~15 | 100~110 | ◉ | ◉ | ○ |
| CuNiFe/ TiO₂/Ag | 8.9 | 53% | Partially exposed | 8~15 | 40~50 | ○ | X | X |
| | 10.3 | 59% | Partially exposed | 8~15 | 70~80 | ○ | ○ | X |
| | 17.3 | 64% | Partially exposed | 8~15 | 80~90 | ○ | ○ | X |
| | 19.3 | 66% | Partially exposed | 8~15 | 100~110 | ○ | ○ | X |
| CuNiFe/ SiO₂/Ag | 8.6 | 54% | Partially exposed | 8~15 | 40~50 | ○ | ○ | X |
| | 10.0 | 59% | Partially exposed | 8~15 | 70~80 | ◉ | ○ | X |
| | 14.7 | 62% | Partially exposed | 8~15 | 80~90 | ◉ | ○ | ○ |
| | 19.6 | 66% | Partially exposed | 8~15 | 100~110 | ◉ | ○ | ○ |

* Color change was visually observed.
◉: No color change,
○: weak color change,
X: color changed to yellow As a result of measuring light fastness, when the metal oxide coating layer was exposed and the silver content was less than 10% by weight (relative to the weight of the magnetic core), the color of all magnetic cores changed to yellow. When the metal oxide coating layer was exposed and the silver content was in a range of 10 to 20% by weight, in the case in which the metal oxide coating layer was TiO₂ and SiO₂, the color of the magnetic particles changed to yellow after 144 hours and 240 hours. In particular, the color of the titanium oxide coating layer changed within a short time so that the color change was easily visually confirmed. It was confirmed from the measurement results of light fastness that since the titanium oxide coating layer served as a photocatalyst and easily caused a color change of the magnetic particles, the titanium oxide coating layer is inappropriate for being used as a metal oxide coating layer in the magnetic particles.

TABLE 8

Measurement of alkali resistance - AlNiCo magnetic core

| Magnetic particle | Silver content (% by weight) | Reflectance (900 nm) | Exposure of ZrO₂ coating layer | ZrO₂ coating layer thickness (nm) | Ag coating layer thickness (nm) | Color change (hour) | | |
|---|---|---|---|---|---|---|---|---|
| | | | | | | 24 | 48 | 100 |
| AlNiCo/ ZrO₂/Ag | 8.7 | 54% | Partially exposed | 8~15 | 40~50 | ◉ | ○ | X |
| | 10.2 | 60% | Partially exposed | 8~15 | 50~60 | ◉ | ◉ | ○ |
| | 15.6 | 62% | Partially exposed | 8~15 | 80~90 | ◉ | ◉ | ○ |
| | 19.8 | 66% | Partially exposed | 8~15 | 100~110 | ◉ | ◉ | ○ |
| AlNiCo/ TiO₂/Ag | 8.9 | 52% | Partially exposed | 8~15 | 40~50 | ○ | X | X |
| | 10.4 | 58% | Partially exposed | 8~15 | 50~60 | ○ | ○ | X |
| | 14.9 | 61% | Partially exposed | 8~15 | 80~90 | ○ | ○ | X |
| | 19.3 | 65% | Partially exposed | 8~15 | 100~110 | ○ | ○ | X |

TABLE 8-continued

Measurement of alkali resistance - AlNiCo magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Color change (hour) 24 | 48 | 100 |
|---|---|---|---|---|---|---|---|---|
| AlNiCo/ SiO$_2$/Ag | 8.9 | 50% | Partially exposed | 8~15 | 40~50 | ○ | X | X |
|  | 10.1 | 57% | Partially exposed | 8~15 | 50~60 | ○ | ○ | X |
|  | 15.8 | 60% | Partially exposed | 8~15 | 80~90 | ○ | ○ | X |
|  | 19.7 | 63% | Partially exposed | 8~15 | 100~110 | ○ | ○ | X |

\* Color change was visually observed.
◉: No color change,
○: weak color change,
X: color changed to yellow

TABLE 9

Measurement of alkali resistance - FeCrCo magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Color change (hour) 24 | 48 | 100 |
|---|---|---|---|---|---|---|---|---|
| FeCrCo/ ZrO$_2$/Ag | 8.8 | 53% | Partially exposed | 8~15 | 40~50 | ◉ | ○ | X |
|  | 10.4 | 59% | Partially exposed | 8~15 | 70~80 | ◉ | ◉ | ○ |
|  | 14.9 | 63% | Partially exposed | 8~15 | 80~90 | ◉ | ◉ | ○ |
|  | 19.7 | 66% | Partially exposed | 8~15 | 100~110 | ◉ | ◉ | ○ |
| FeCrCo/ TiO$_2$/Ag | 8.7 | 54% | Partially exposed | 8~15 | 40~50 | ○ | X | X |
|  | 10.2 | 60% | Partially exposed | 8~15 | 70~80 | ○ | ○ | X |
|  | 14.8 | 64% | Partially exposed | 8~15 | 80~90 | ○ | ○ | X |
|  | 19.6 | 66% | Partially exposed | 8~15 | 100~110 | ○ | ○ | X |
| FeCrCo/ SiO$_2$/Ag | 8.8 | 52% | Partially exposed | 8~15 | 40~50 | ○ | X | X |
|  | 10.3 | 59% | Partially exposed | 8~15 | 70~80 | ○ | ○ | X |
|  | 14.6 | 63% | Partially exposed | 8~15 | 80~90 | ○ | ○ | X |
|  | 19.4 | 66% | Partially exposed | 8~15 | 100~110 | ○ | ○ | X |

\* Color change was visually observed.
◉: No color change,
○: weak color change,
X: color changed to yellow

TABLE 10

Measurement of alkali resistance - CuNiFe magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Color change (hour) 24 | 48 | 100 |
|---|---|---|---|---|---|---|---|---|
| CuNiFe/ ZrO$_2$/Ag | 9.0 | 52% | Partially exposed | 8~15 | 40~50 | ◉ | ○ | X |

TABLE 10-continued

Measurement of alkali resistance - CuNiFe magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Color change (hour) 24 | 48 | 100 |
|---|---|---|---|---|---|---|---|---|
| | 10.1 | 60% | Partially exposed | 8~15 | 70~80 | ◉ | ◉ | ○ |
| | 16.1 | 63% | Partially exposed | 8~15 | 80~90 | ◉ | ◉ | ○ |
| | 19.9 | 65% | Partially exposed | 8~15 | 100~110 | ◉ | ◉ | ○ |
| CuNiFe/ TiO$_2$/Ag | 8.9 | 53% | Partially exposed | 8~15 | 40~50 | ○ | X | X |
| | 10.3 | 59% | Partially exposed | 8~15 | 70~80 | ○ | ○ | X |
| | 17.3 | 64% | Partially exposed | 8~15 | 80~90 | ○ | ○ | X |
| | 19.3 | 66% | Partially exposed | 8~15 | 100~110 | ○ | ○ | X |
| CuNiFe/ SiO$_2$/Ag | 8.6 | 54% | Partially exposed | 8~15 | 40~50 | ○ | X | X |
| | 10.0 | 59% | Partially exposed | 8~15 | 70~80 | ○ | ○ | X |
| | 14.7 | 62% | Partially exposed | 8~15 | 80~90 | ○ | ○ | X |
| | 19.6 | 66% | Partially exposed | 8~15 | 100~110 | ○ | ○ | X |

* Color change was visually observed.
◉: No color change,
○: weak color change,
X: color changed to yellow As a result of measuring alkali resistance, when the metal oxide coating layer was exposed and the silver content was less than 10% by weight (relative to the weight of the magnetic core), the color of all magnetic cores changed to yellow. When the metal oxide coating layer was exposed and the silver content was in a range of 10 to 20% by weight, in the case in which the metal oxide coating layer was TiO$_2$ and SiO$_2$, the color of the magnetic particles changed to yellow after 48 hours and 100 hours. Under the alkali conditions, the silicon dioxide coating layer and the titanium oxide coating layer caused a color change within a short time so that the color change was easily visually confirmed.

TABLE 11

Measurement of acid resistance and magnetic properties of magnetic particles - AlNiCo magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Before acid treatment Hc | Ms (emg/g) | After acid treatment Hc | Ms (emg/g) |
|---|---|---|---|---|---|---|---|---|---|
| AlNiCo/ ZrO$_2$/Ag | 8.7 | 54% | Partially exposed | 8~15 | 40~50 | 440 | 155 | 441 | 121 |
| | 10.2 | 60% | Partially exposed | 8~15 | 50~60 | 442 | 148 | 439 | 119 |
| | 15.6 | 62% | Partially exposed | 8~15 | 80~90 | 439 | 135 | 440 | 115 |
| | 19.8 | 66% | Partially exposed | 8~15 | 100~110 | 438 | 129 | 437 | 110 |
| AlNiCo/ TiO$_2$/Ag | 8.9 | 52% | Partially exposed | 8~15 | 40~50 | 439 | 154 | 438 | 89 |
| | 10.4 | 58% | Partially exposed | 8~15 | 50~60 | 438 | 148 | 438 | 81 |
| | 14.9 | 61% | Partially exposed | 8~15 | 80~90 | 440 | 136 | 434 | 80 |
| | 19.3 | 65% | Partially exposed | 8~15 | 100~110 | 435 | 127 | 404 | 78 |

TABLE 11-continued

Measurement of acid resistance and magnetic properties of magnetic particles - AlNiCo magnetic core

| | | | | | | Magnetic property change | | | |
|---|---|---|---|---|---|---|---|---|---|
| | | | | | | Before acid treatment | | After acid treatment | |
| Magnetic particle | Silver content (% by weight) | Reflectance (900 nm) | Exposure of ZrO$_2$ coating layer | ZrO$_2$ coating layer thickness (nm) | Ag coating layer thickness (nm) | Hc | Ms (emg/g) | Hc | Ms (emg/g) |
| AlNiCo/ SiO$_2$/Ag | 8.9 | 50% | Partially exposed | 8~15 | 40~50 | 455 | 154 | 451 | 91 |
| | 10.1 | 57% | Partially exposed | 8~15 | 50~60 | 450 | 146 | 447 | 88 |
| | 15.8 | 60% | Partially exposed | 8~15 | 80~90 | 451 | 135 | 441 | 88 |
| | 19.7 | 63% | Partially exposed | 8~15 | 100~110 | 456 | 130 | 450 | 76 |

TABLE 12

Measurement of acid resistance and magnetic properties of magnetic particles - FeCrCo magnetic core

| | | | | | | Magnetic property change | | | |
|---|---|---|---|---|---|---|---|---|---|
| | | | | | | Before acid treatment | | After acid treatment | |
| Magnetic particle | Silver content (% by weight) | Reflectance (900 nm) | Exposure of ZrO$_2$ coating layer | ZrO$_2$ coating layer thickness (nm) | Ag coating layer thickness (nm) | Hc | Ms (emg/g) | Hc | Ms (emg/g) |
| FeCrCo/ ZrO$_2$/Ag | 8.8 | 53% | Partially exposed | 8~15 | 40~50 | 404 | 157 | 392 | 106 |
| | 10.4 | 59% | Partially exposed | 8~15 | 70~80 | 398 | 149 | 384 | 104 |
| | 14.9 | 63% | Partially exposed | 8~15 | 80~90 | 401 | 144 | 399 | 105 |
| | 19.7 | 66% | Partially exposed | 8~15 | 100~110 | 405 | 131 | 388 | 100 |
| FeCrCo/ TiO$_2$/Ag | 8.7 | 54% | Partially exposed | 8~15 | 40~50 | 399 | 155 | 380 | 90 |
| | 10.2 | 60% | Partially exposed | 8~15 | 70~80 | 397 | 157 | 361 | 78 |
| | 14.8 | 64% | Partially exposed | 8~15 | 80~90 | 394 | 160 | 368 | 78 |
| | 19.6 | 66% | Partially exposed | 8~15 | 100~110 | 397 | 151 | 378 | 74 |
| FeCrCo/ SiO$_2$/Ag | 8.8 | 52% | Partially exposed | 8~15 | 40~50 | 408 | 151 | 380 | 82 |
| | 10.3 | 59% | Partially exposed | 8~15 | 70~80 | 401 | 145 | 376 | 74 |
| | 14.6 | 63% | Partially exposed | 8~15 | 80~90 | 403 | 154 | 378 | 70 |
| | 19.4 | 66% | Partially exposed | 8~15 | 100~110 | 398 | 151 | 372 | 67 |

TABLE 13

Measurement of acid resistance and magnetic properties of magnetic particles - CuNiFe magnetic core

| Magnetic particle | Silver content (% by weight) | Reflectance (900 nm) | Exposure of ZrO$_2$ coating layer | ZrO$_2$ coating layer thickness (nm) | Ag coating layer thickness (nm) | Before acid treatment | | After acid treatment | |
|---|---|---|---|---|---|---|---|---|---|
| | | | | | | Hc | Ms (emg/g) | Hc | Ms (emg/g) |
| CuNiFe/ ZrO$_2$/Ag | 9.0 | 52% | Partially exposed | 8~15 | 40~50 | 377 | 143 | 347 | 108 |
| | 10.1 | 60% | Partially exposed | 8~15 | 70~80 | 382 | 140 | 353 | 104 |
| | 16.1 | 63% | Partially exposed | 8~15 | 80~90 | 380 | 141 | 350 | 101 |
| | 19.9 | 65% | Partially exposed | 8~15 | 100~110 | 381 | 145 | 354 | 100 |
| CuNiFe/ TiO$_2$/Ag | 8.9 | 53% | Partially exposed | 8~15 | 40~50 | 376 | 145 | 341 | 80 |
| | 10.3 | 59% | Partially exposed | 8~15 | 70~80 | 375 | 148 | 343 | 74 |
| | 17.3 | 64% | Partially exposed | 8~15 | 80~90 | 374 | 141 | 339 | 71 |
| | 19.3 | 66% | Partially exposed | 8~15 | 100~110 | 375 | 145 | 338 | 69 |
| CuNiFe/ SiO$_2$/Ag | 8.6 | 54% | Partially exposed | 8~15 | 40~50 | 379 | 138 | 341 | 76 |
| | 10.0 | 59% | Partially exposed | 8~15 | 70~80 | 379 | 139 | 346 | 69 |
| | 14.7 | 62% | Partially exposed | 8~15 | 80~90 | 375 | 131 | 341 | 64 |
| | 19.6 | 66% | Partially exposed | 8~15 | 100~110 | 370 | 132 | 339 | 61 |

As a result of measuring acid resistance and properties of magnetic particles, when the metal oxide coating layer was exposed and the silver content was less than 10% by weight (relative to the weight of the magnetic core), all magnetic particles showed large changes in coercivity (hc) and saturation magnetization (Ms).

When the metal oxide coating layer was exposed and the silver content was in a range of 10 to 20% by weight, in the case in which the metal oxide coating layer was ZrO$_2$ rather than the case in which the metal oxide coating layer was TiO$_2$ and SiO$_2$, changes in coercivity (hc) and saturation magnetization (Ms) after acid treatment were relatively significantly small, and when the magnetic core was AlNiCo, changes in coercivity (hc) and saturation magnetization (Ms) after acid treatment were significantly small relative to other magnetic cores.

The invention claimed is:

1. A magnetic particle consisting of:
a magnetic core;
a zirconium oxide coating layer formed on the magnetic core; and
a silver coating layer formed on the zirconium oxide coating layer,
wherein the silver coating layer has a silver content of 10 to 20% by weight relative to a weight of the magnetic core,
wherein the magnetic core includes one or more selected from the group consisting of Fe, Cu, Al, Ni, Co, Nb, Nd, Si, B, Cr, and Sm,
wherein the magnetic particle has a reflectance of 50 to 70% at a wavelength of 900 nm, and
wherein the zirconium oxide coating layer of the magnetic particle is not completely coated with the silver coating layer of the magnetic particle, and a part of a surface of the zirconium oxide coating layer of the magnetic particle is an outside of the magnetic particle.

2. The magnetic particle of claim 1, wherein the silver coating layer of the magnetic particle has a thickness of 50 to 120 nm.

3. The magnetic particle of claim 1, wherein the magnetic core has a particle size distribution D$_{90}$ of 8 to 15 μm.

4. A security ink comprising the magnetic particle of claim 1.

5. Securities to which the security ink of claim 4 is applied.

* * * * *